United States Patent
Seo

(10) Patent No.: US 9,883,229 B2
(45) Date of Patent: Jan. 30, 2018

(54) CABLE MODEM APPARATUS, BROADCASTING SIGNAL RECEIVING APPARATUS, BROADCASTING SIGNAL TRANSMITTING APPARATUS AND CONTROL METHOD THEREOF

(71) Applicant: SAMSUNG ELECTRONICS CO., LTD., Suwon-si (KR)

(72) Inventor: Dong-uk Seo, Cheonan-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/723,575

(22) Filed: May 28, 2015

(65) Prior Publication Data

US 2015/0358669 A1 Dec. 10, 2015

(30) Foreign Application Priority Data

Jun. 9, 2014 (KR) ........................ 10-2014-0069541

(51) Int. Cl.
*H04N 7/173* (2011.01)
*H04N 21/426* (2011.01)
*H04N 21/443* (2011.01)
*H04N 21/438* (2011.01)

(52) U.S. Cl.
CPC ... *H04N 21/42676* (2013.01); *H04N 21/4383* (2013.01); *H04N 21/4436* (2013.01)

(58) Field of Classification Search
CPC ............ H04L 12/2801; H04N 7/17309; H04N 21/42676; H04N 21/4436; H04N 21/6168; H04N 21/6118

USPC ........................................................ 725/111
See application file for complete search history.

(56) References Cited

U.S. PATENT DOCUMENTS

| | | | | |
|---|---|---|---|---|
| 5,900,913 A * | 5/1999 | Tults | ................... | H04N 5/44513 348/468 |
| 6,317,780 B1 * | 11/2001 | Cohn | ................ | G06F 17/30902 707/E17.12 |
| 6,523,126 B1 * | 2/2003 | Brabenac | ............ | G06F 11/0757 340/3.1 |
| 6,684,110 B1 * | 1/2004 | Kutsuna | .................. | G05B 15/02 700/17 |
| 6,690,655 B1 * | 2/2004 | Miner | ..................... | H04L 12/12 370/278 |
| 7,523,329 B2 | 4/2009 | Ezra et al. | | |
| 7,529,289 B2 * | 5/2009 | Currivan | .................. | H04B 1/71 375/144 |
| 7,546,618 B2 * | 6/2009 | Bacon | .................... | H04N 7/163 380/210 |
| 9,306,784 B2 * | 4/2016 | Wu | .................... | H04W 52/0229 |
| 2006/0082690 A1 * | 4/2006 | Englert | .................. | H04N 5/445 348/731 |
| 2006/0225109 A1 * | 10/2006 | Seo | ........................ | H04N 5/4401 725/100 |
| 2006/0227215 A1 * | 10/2006 | Yamauchi | ............. | H04L 1/0014 348/193 |

(Continued)

FOREIGN PATENT DOCUMENTS

KR 10-0642042 B1 11/2006

*Primary Examiner* — An Son P Huynh
(74) *Attorney, Agent, or Firm* — Sughrue Mion, PLLC

(57) ABSTRACT

A cable modem apparatus configured to switch between communicating over a plurality of channels and a channel different from the plurality of channels.

19 Claims, 11 Drawing Sheets (a)　　　(b)

(56) References Cited

U.S. PATENT DOCUMENTS

| | | | | |
|---|---|---|---|---|
| 2006/0236356 A1* | 10/2006 | Takagi | H04N 5/4401 | 725/100 |
| 2007/0014533 A1* | 1/2007 | Korehisa | G11B 27/105 | 386/296 |
| 2007/0040947 A1* | 2/2007 | Koga | H04N 5/63 | 348/725 |
| 2007/0064159 A1* | 3/2007 | Kim | H04N 5/63 | 348/730 |
| 2007/0109445 A1* | 5/2007 | Lee | H04H 20/42 | 348/559 |
| 2007/0188665 A1* | 8/2007 | Watson | H04N 5/4401 | 348/731 |
| 2007/0268403 A1* | 11/2007 | Oda | H04N 5/63 | 348/460 |
| 2008/0018427 A1* | 1/2008 | Ezra | H04L 1/22 | 340/7.32 |
| 2008/0034398 A1* | 2/2008 | Furui | H04N 5/44543 | 725/139 |
| 2008/0048774 A1* | 2/2008 | Chang | H03F 1/0277 | 330/51 |
| 2008/0130543 A1* | 6/2008 | Singh | H04N 21/43615 | 370/311 |
| 2008/0201745 A1* | 8/2008 | Chien | H04N 5/44543 | 725/53 |
| 2008/0219212 A1* | 9/2008 | Kim | H04W 36/0066 | 370/331 |
| 2008/0246888 A1* | 10/2008 | Oh | H04N 5/4401 | 348/730 |
| 2009/0102969 A1* | 4/2009 | Knutson | H04N 21/234309 | 348/471 |
| 2009/0167855 A1* | 7/2009 | Kummer | H04N 5/4403 | 348/114 |
| 2009/0187946 A1* | 7/2009 | Yousef | H04N 7/1675 | 725/46 |
| 2009/0195693 A1* | 8/2009 | Yokoyama | H03G 3/3068 | 348/554 |
| 2009/0273713 A1* | 11/2009 | Goldman | G08B 21/10 | 348/563 |
| 2010/0125890 A1* | 5/2010 | Levine | H04N 7/173 | 725/131 |
| 2010/0295839 A1* | 11/2010 | Nagaya | G06F 1/3265 | 345/212 |
| 2010/0302456 A1* | 12/2010 | Testin | G06F 1/3203 | 348/706 |
| 2011/0145708 A1* | 6/2011 | Bhogal | H04L 65/4092 | 715/716 |
| 2011/0206162 A1* | 8/2011 | Lococo | H04B 1/1615 | 375/316 |
| 2012/0128045 A1* | 5/2012 | Ling | H04L 12/2801 | 375/222 |
| 2012/0140122 A1* | 6/2012 | Lai | H04B 1/18 | 348/707 |
| 2013/0094551 A1* | 4/2013 | Ling | G06F 1/3209 | 375/222 |
| 2013/0145396 A1* | 6/2013 | Sung | G06F 1/3203 | 725/40 |
| 2013/0150059 A1* | 6/2013 | Kim | H04W 72/0486 | 455/450 |
| 2013/0242202 A1* | 9/2013 | Shintani | H04N 21/426 | 348/730 |
| 2014/0129859 A1* | 5/2014 | O'Malley | G06F 1/3209 | 713/323 |
| 2014/0169502 A1* | 6/2014 | Lovell | H04L 5/0007 | 375/324 |
| 2015/0067815 A1* | 3/2015 | Overcash | G06F 1/32 | 726/11 |
| 2015/0085907 A1* | 3/2015 | Cooper | H04M 11/062 | 375/222 |
| 2016/0014467 A1* | 1/2016 | Zhang | H04N 21/251 | 725/14 |
| 2016/0044292 A1* | 2/2016 | Gordon | H04N 21/234327 | 348/453 |
| 2016/0111039 A1* | 4/2016 | Iwami | H04N 21/43637 | 345/520 |

* cited by examiner (a)  (b)

CABLE MODEM APPARATUS, BROADCASTING SIGNAL RECEIVING APPARATUS, BROADCASTING SIGNAL TRANSMITTING APPARATUS AND CONTROL METHOD THEREOF

CROSS-REFERENCE TO RELATED APPLICATION

This application claims priority from Korean Patent Application No. 10-2014-0069541, filed on Jun. 9, 2014, in the Korean Intellectual Property Office, the entire disclosure of which is incorporated herein by reference.

BACKGROUND

Field

Apparatuses and methods consistent with the exemplary embodiments relate to a cable modem apparatus, a broadcasting signal receiving apparatus, a broadcasting signal transmitting apparatus and a control method thereof, and more particularly to a cable modem apparatus, a broadcasting signal receiving apparatus, a broadcasting signal transmitting apparatus and a control method thereof, which can reduce power consumed in receiving data of broadcasting signals through a plurality of channels.

Description of Related Art

A conventional cable modem or a set-top box having a built-in cable modem has a structure of always consuming power to communicate with a headend through a hybrid fiber-coax (HFC) network, even when the cable modem or set-top box is not in use. The cable modem or the set-top box consumes power 24 hours per day as long as a power cord is connected and a power switch is not turned off. In particular, a user is inconvenienced as it takes a long time to boot the set-top box when the power cord is unplugged and then plugged in again. Thus, a user is likely to always keep the cable modem or set-top box connected to power.

Although a user may cause the cable modem to enter a standby mode or a sleep mode through a power button on a remote controller, communication between the headend and the cable modem is still maintained for 24 hours per day to be ready when needed by a user. Therefore, the existing cable modem and set-top box have a problem of wastefully consuming much power even while a user does not view a cable broadcast.

SUMMARY

Aspects of an exemplary embodiments provide a cable modem apparatus, a broadcasting signal receiving apparatus, a broadcasting signal transmitting apparatus and a control method thereof, in which if there is entry into a first low-power mode while a broadcasting signal of a predetermined channel is received using a data channel including a plurality of channels in a normal mode, communication is performed through a networking channel different from the plurality of channels in response to the entry into the first low-power mode.

In accordance with an aspect of an exemplary embodiment, there is provided a cable modem apparatus including: a communicator configured to communicate with a broadcasting signal transmitting apparatus to receive a broadcasting signal of a predetermined channel; and a controller configured to perform control to communicate with the broadcasting signal transmitting apparatus by converting a data channel including a plurality of channels into a networking channel different from the plurality of channels if there is entry into a first low-power mode while communicating with the broadcasting signal transmitting apparatus through the data channel including the plurality of channels in a normal mode, and to receive data of the broadcasting signal from the broadcasting signal transmitting apparatus by converting the networking channel into the data channel including the plurality of channels in response to return from the first low-power mode to the normal mode. Thus, the cable modem apparatus enters the first low-power mode to consume only the minimum power for maintaining communication if it is not in use, and returns to the normal mode quickly when it is desired to be used by a user, thereby having an effect on reducing the standby power of the cable modem apparatus.

The networking channel may be fewer than the plurality of channels for the data channel. Thus, it is possible to reduce power consumption since the first low-power mode consumes less power than the normal mode.

The networking channel may be assigned to a frequency band different from frequencies of the data channel. Thus, in the first low-power mode, it is possible to maintain communication without using the frequencies for receiving data.

At least one among the plurality of channels for the data channel may be adjacent to the frequency band of the networking channel. Also, the plurality of channels for the data channel may be divisionally arranged with respect to the frequency band of the networking channel.

The controller may make a request for changing into the networking channel to the broadcasting signal transmitting apparatus if there is entry into the first low-power mode, and the data channel is converted into the networking channel. Thus, when the cable modem apparatus is not in use, it is possible to quickly enter the first low-power mode through smooth communication with the broadcasting signal transmitting apparatus.

The controller may make a request for changing into the data channel to the broadcasting signal transmitting apparatus in response to return to the normal mode, and the networking channel is converted into the data channel. Thus, when the cable modem apparatus is used again by a user, it is possible to quickly return to the normal mode through smooth communication with the broadcasting signal transmitting apparatus.

The cable modem apparatus may further include a user input configured to receive a user's input, and the controller may enter one of the normal mode and the first low-power mode in response to the user's input. Thus, it is possible to operate instantly as a user directly selects the normal mode or the first low-power mode.

The controller may enter the first low-power mode if there is no user's input for a predetermined period of time. Thus, it is possible to automatically enter the first low-power mode even though there is no user's input, thereby effectively reducing power consumption.

In accordance with an aspect of an exemplary embodiment, there is provided a broadcasting signal receiving apparatus including: the cable modem apparatus of claim 1; a signal processor configured to process a broadcasting signal received in the cable modem apparatus to display an image; a communicator configured to communicate with the display apparatus; and a controller configured to output the processed broadcasting signal to the display apparatus.

In accordance with an aspect of an exemplary embodiment, there is provided a broadcasting signal transmitting apparatus including: a communicator configured to communicate with a cable modem apparatus to transmit a broadcasting signal of a predetermined channel; and a controller configured to perform control to communicate with the cable modem apparatus by converting a data channel including a plurality of channels into a networking channel different from the plurality of channels if there is entry into a first low-power mode while communicating with the cable modem apparatus through the data channel including the plurality of channels in a normal mode, and to transmit data of the broadcasting signal to the cable modem apparatus by converting the networking channel into the data channel including the plurality of channels in response to return from the first low-power mode to the normal mode.

The networking channel may be fewer than the plurality of channels for the data channel.

The networking channel may be assigned to a frequency band different from frequencies of the data channel.

At least one among the plurality of channels for the data channel may be adjacent to the frequency band of the networking channel.

The plurality of channels for the data channel may be divisionally arranged with respect to the frequency band of the networking channel.

The controller may convert the data channel into the networking channel in response to a request from the cable modem apparatus, and sends the cable modem apparatus a command of changing into the networking channel.

In accordance with an aspect of an exemplary embodiment, there is provided a method of controlling a cable modem apparatus, the method including: communicating with a broadcasting signal transmitting apparatus to receive a broadcasting signal of a predetermined channel; communicating with the broadcasting signal transmitting apparatus by converting a data channel including a plurality of channels into a networking channel different from the plurality of channels if there is entry into a first low-power mode while communicating with the broadcasting signal transmitting apparatus through the data channel including the plurality of channels in a normal mode; and receiving data of the broadcasting signal from the broadcasting signal transmitting apparatus by converting the networking channel into the data channel including the plurality of channels in response to return from the first low-power mode to the normal mode.

The method may further include making a request for changing into the networking channel to the broadcasting signal transmitting apparatus if there is entry into the first low-power mode, and converting the data channel into the networking channel.

The method may further include making a request for changing into the data channel to the broadcasting signal transmitting apparatus in response to return to the normal mode, and converting the networking channel into the data channel.

The method may further include switching from the normal mode to a second low-power mode of an audio/video-off state, or switching from the second low-power mode to the first low-power mode.

In accordance with an aspect of an exemplary embodiment, there is provided a method of controlling a broadcasting signal transmitting apparatus, the method including: communicating with a cable modem apparatus to transmit a broadcasting signal of a predetermined channel; and communicating with the cable modem apparatus by converting a data channel including a plurality of channels into a networking channel different from the plurality of channels if there is entry into a first low-power mode while communicating with the cable modem apparatus through the data channel including the plurality of channels in a normal mode; and transmitting data of the broadcasting signal to the cable modem apparatus by converting the networking channel into the data channel including the plurality of channels in response to return from the first low-power mode to the normal mode.

The method may further include converting the data channel into the networking channel in response to a request from the cable modem apparatus; and sending the cable modem apparatus a command of changing into the networking channel.

The method may further include converting the networking channel to the data channel in response to a request from the cable modem apparatus; and sending the cable modem apparatus a command of changing into the data channel.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION OF EXEMPLARY EMBODIMENTS

Figure 1:
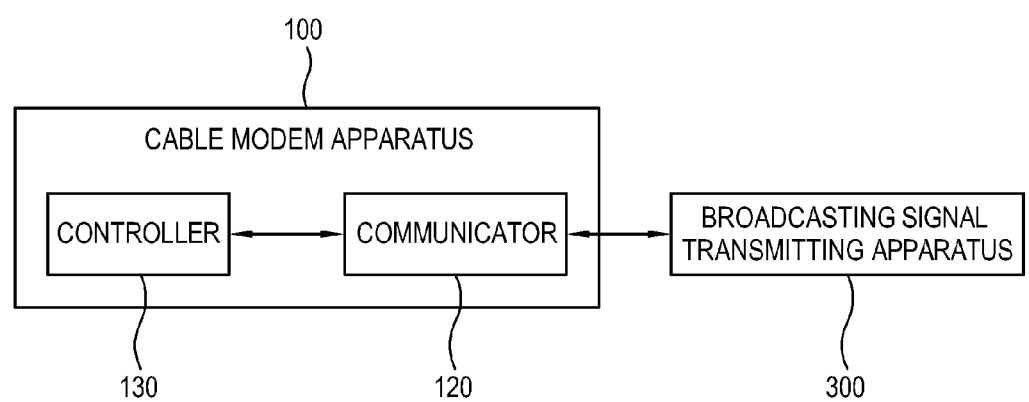
FIG. 1 is a block diagram of a cable modem apparatus according to an exemplary embodiment.

Hereinafter, terms that are used in the specification will be briefly described, and exemplary embodiments will be described in detail. The drawings may not be to scale, and the relative size, proportions, and depiction of elements in the drawings may be exaggerated for clarity, illustration, and convenience.

The following detailed description is provided to assist the reader in gaining a comprehensive understanding of the methods, apparatuses, and/or systems described herein.

However, various changes, modifications, and equivalents of the methods, apparatuses and/or systems described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

All terms including descriptive or technical terms used herein should be construed as having meanings that are obvious to one of ordinary skill in the art. However, the terms may have different meanings according to an intention of one of ordinary skill in the art, precedent cases, or the appearance of new technologies. Also, some terms may be arbitrarily selected by the applicant, and in this case, the meaning of the selected terms will be described in detail in the detailed description of the disclosure. Thus, the terms used herein have to be defined based on the meaning of the terms together with the description throughout the specification.

Also, when a part "includes" or "comprises" an element, unless there is a particular description contrary thereto, the part can further include other elements, not excluding the other elements. In the following description, terms such as "unit" and "module" indicate a unit for processing at least one function or operation, wherein the unit and the block may be embodied as hardware or software or embodied by combining hardware and software.

[1] One or more exemplary embodiments of the present disclosure will now be described more fully with reference to the accompanying drawings. However, the one or more exemplary embodiments of the present disclosure may be embodied in many different forms, and should not be construed as being limited to the exemplary embodiments set forth herein. Rather, these exemplary embodiments are provided so that this disclosure will be thorough and complete, and will fully convey the concept of the one or more exemplary embodiments of the present disclosure to those of ordinary skill in the art. In the following description, well-known functions or constructions are not described in detail because the well-known functions would obscure the one or more exemplary embodiments of the present disclosure with unnecessary detail. Like reference numerals in the drawings denote like or similar elements throughout the specification.

Elements of a cable modem apparatus according to exemplary embodiments will be described first with reference to FIG. 1, and then with reference to FIGS. 4 to 8 and FIG. 11 as necessary. FIG. 1 is a block diagram of a cable modem apparatus according to an exemplary embodiment. As shown in FIG. 1, a cable modem apparatus 100 may include a communicator 120 (i.e., communication interface) and a controller 130. The cable modem apparatus 100 may communicate with a broadcasting signal transmitting apparatus 300. The broadcasting signal transmitting apparatus 300 may, for example, be a headend. The cable modem apparatus 100 may communicate with the broadcasting signal transmitting apparatus 300 to receive a broadcasting signal of a predetermined channel. The cable modem apparatus 100 may continue to communicate with the broadcasting signal transmitting apparatus 300 in a first low-power mode entered while communicating with the broadcasting signal transmitting apparatus 300 in a normal mode through the data channel including a plurality of channels. The communication is continued by switching from communicating over a data channel, the data channel including a plurality of channels, to a networking channel different from the plurality of channels.

When the cable modem apparatus 100 returns to the normal mode, data of a broadcasting signal from the broadcasting signal transmitting apparatus 300 may continue to be received. Communication may be continued by switching from communicating over the networking channel to communicating over the data channel.

According to an aspect of an exemplary embodiment, the cable modem apparatus 100 may enter the first low-power mode, thereby consuming only the minimum power for maintaining communication while not in use, and quickly return to the normal mode when desired to be used by a user. Standby power usage may thereby be reduced.

The communicator 120 may communicate with the broadcasting signal transmitting apparatus 300 to receive a broadcasting signal of a predetermined channel. The communicator 120 may, for example, use a hybrid fiber-coax (HFC) network.

The controller 130 may control the communicator to continue to communicate with the broadcasting signal transmitting apparatus 300 if a first low-power mode is entered while communicating with the broadcasting signal transmitting apparatus 300 through the data channel, including a plurality of channels, in a normal mode. The controller may control the communicator to communicate with the broadcasting signal transmitting apparatus 300 by switching communication from the data channel, including the plurality of channels, to the networking channel different from the plurality of channels. When the cable modem apparatus 100 transitions from communicating over the networking channel in the first low-power mode to the normal mode, the controller 130 may control the communicator to continue to receive the data of the broadcasting signal from the broadcasting signal transmitting apparatus 300 through the data channel.

Figure 6:
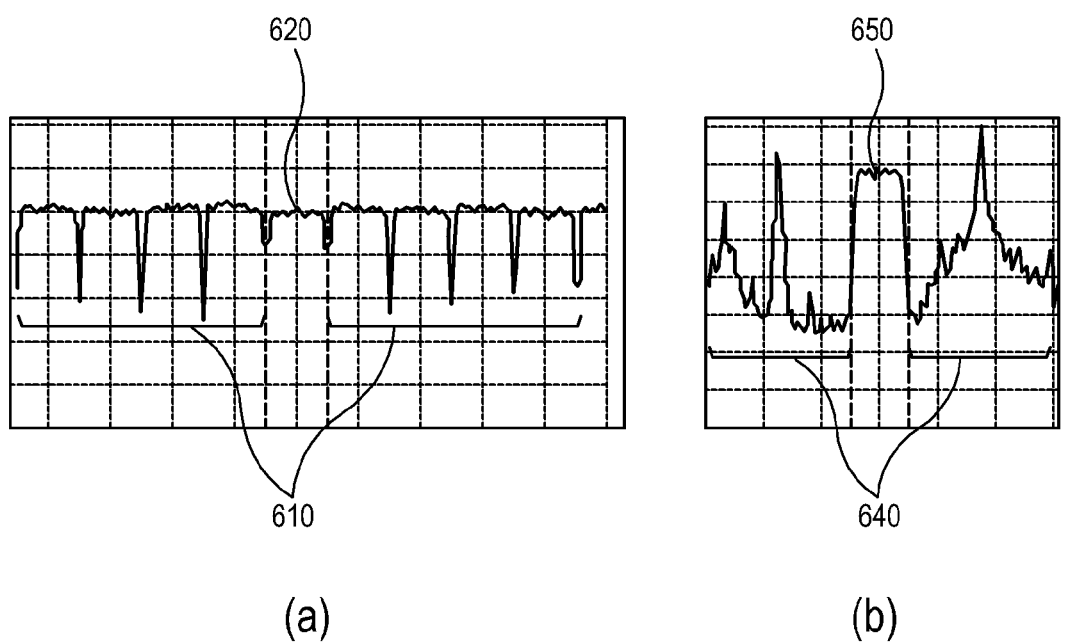
FIG. 6 illustrates exemplary frequencies of channels used in the normal mode and the first low-power mode according to an exemplary embodiment.

While operating in the first low-power mode, there may be fewer networking channels than a number of the plurality of channels while operating in the normal mode. As shown in FIG. 6 (*a*), the number of the plurality of data channels 610 while operating in the normal mode may, for example, be eight (a). As shown in FIG. 6 (*b*), a number of networking channels 650 in the first low-power mode may, for example, be smaller than the number of the plurality of channels. In this case, the number of channels for receiving data while operating in the normal mode is eight, and the number of channels for communication while operating in the first low-power mode is one, thereby having a significant effect on reducing power consumption.

Also, the networking channel may be assigned to a different frequency band than the data channel. As shown in FIG. 6, the networking channels 620, 650 may be assigned to frequency bands different from frequency bands of the data channels 610, 640. In the normal mode, illustrated in FIG. 6 (*a*), only the plurality of channels, which make up the data channel 610, can be used to receive data of the broadcasting signal. In the first low-power mode, illustrated in FIG. 6 (*b*), only the networking channel 650 can be used for communication. Thus, the cable modem apparatus 100 does not use the data channel 640 for communication in the first low-power mode. Instead, the cable modem apparatus 100 uses the networking channel 650 of another frequency band for communication while operating in the first low-power mode. Thereby, communication may be efficiently maintained with the broadcasting signal transmitting apparatus 300.

A frequency band of at least one of the plurality of channels of the data channel may be adjacent to the frequency band of the networking channel, and the plurality of channels of the data channel may be divisionally arranged with respect to the frequency band of the networking channel. As shown in FIG. 6, the frequencies of the data channels 610 and 640 are adjacent to the frequency band of the networking channels 620, 650. For example, eight channels of the data channels 610 and 640 are divided into four left channels and four right channels, with respect to the frequency band of the networking channels 620, 650.

Figure 11:
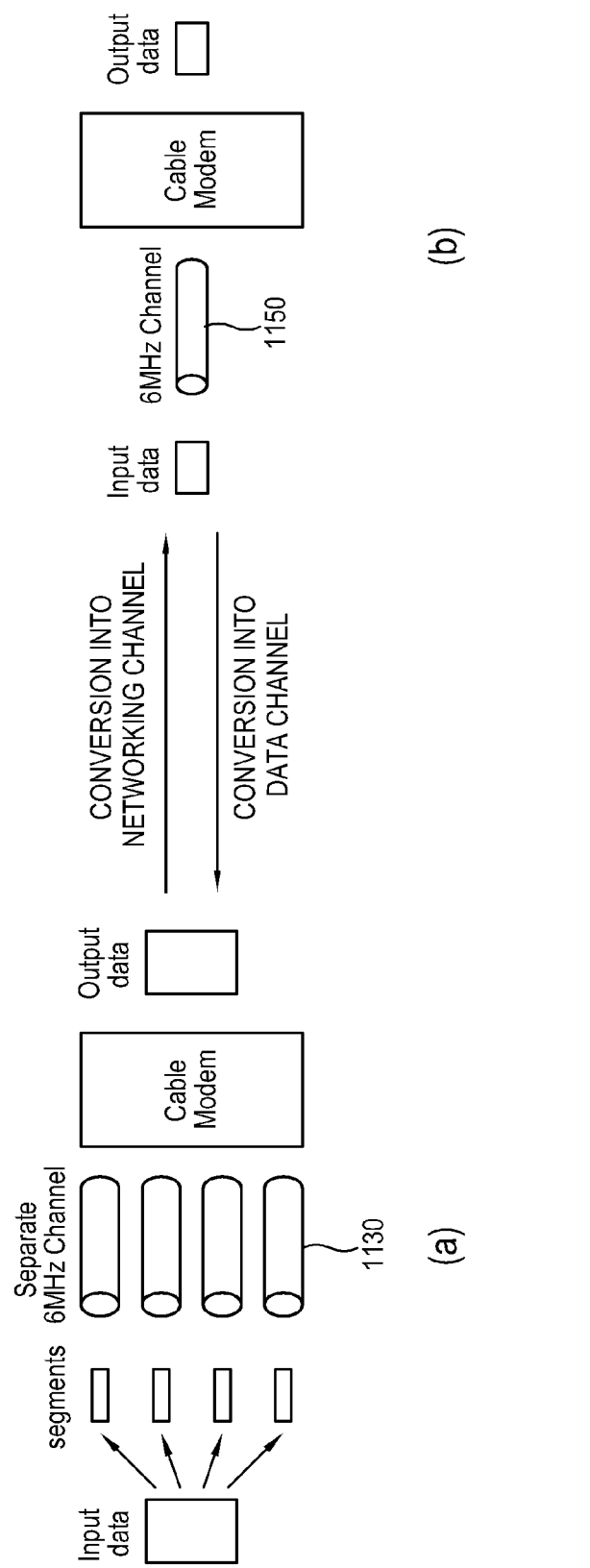
FIG. 11 illustrates an exemplary configuration of a channel in the normal mode and the first low-power mode according to an exemplary embodiment.

According to an exemplary embodiment illustrated in FIG. 11, while operating in the normal mode (a), the data of the broadcasting signal may be received through four channels 1130 each having, for example, a frequency band of 6 MHz. In the first low-power mode (b), the communication may be performed through one channel 1150 having a frequency band of 6 MHz. Thus, it is possible to reduce power consumption, as there are fewer channels in the networking channel than there are in the data channel.

Figure 5:
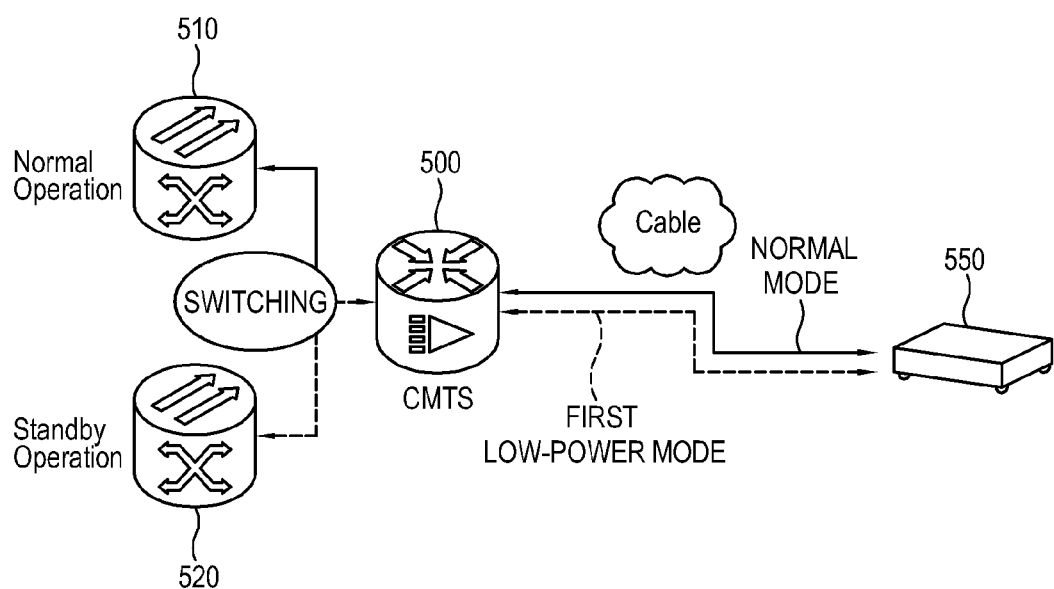
FIG. 5 illustrates an exemplary switching operation between a normal mode and a first low-power mode according to an exemplary embodiment.

Upon entry into the first low-power mode, the controller 130 may transmit a request to the broadcasting signal transmitting apparatus 300 to switch to communication using the networking channel, thereby switching communication from the data channel to the networking channel. For example, as shown in FIG. 5, if a cable modem apparatus 550 enters the first low-power mode, a cable modem termination system (CMTS) 500 of the broadcasting signal transmitting apparatus 300 may be requested to switch into the first low-power mode. The CMTS 500 may then switch the mode from communicating over the data channel to communicating over the networking channel (520), and transmit a command to the cable modem apparatus 550 to switch to communicating over the networking channel. The cable modem apparatus 550 may then switch from communicating over the data channel to communicating over the networking channel in response to receiving the command.

When returning to the normal mode, the controller 130 may transmit a request to the broadcasting signal transmitting apparatus 300 to switch to communicating over the data channel. Thereafter, communication may be performed over the data channel. For example, as shown in FIG. 5, if the cable modem apparatus 550 returns to the normal mode, the CMTS 500 of the broadcasting signal transmitting apparatus 300 is requested to switch into the normal mode. The CMTS 500 may then switch to the normal mode, switch to communicating over the data channel (510), and transmit a command of changing to the normal mode to the cable modem apparatus 550. The cable modem apparatus 550 may then change from communicating over the networking channel to communicating over the data channel, in response to receiving the command.

According to an aspect of an exemplary embodiment, an input device may be further provided and configured to receive a user input. The controller 130 may control the cable modem apparatus 100 to enter one of the normal mode and the first low-power mode in response to the user input. For example, if a user presses a button on a remote controller to select one of the normal mode and the first low-power mode, the cable modem apparatus 100 may enter one of the normal mode and the first low-power mode, and thereafter operate based on the entered mode. Also, if no user input is received for a predetermined period of time or more, the cable modem apparatus 100 may enter the first low-power mode.

Figure 7:
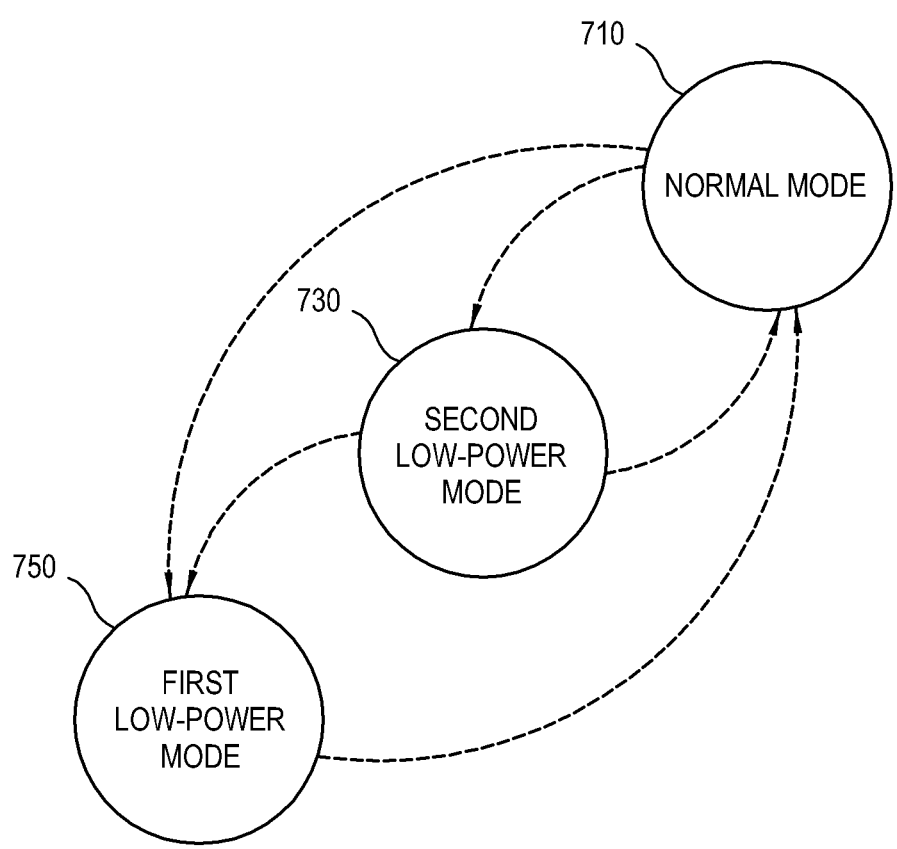
FIG. 7 illustrates an exemplary switching operation among the normal mode, a second low-power mode and a first low-power mode according to an exemplary embodiment.

FIG. 7 shows a second low-power mode, according to an aspect of an exemplary embodiment. The second low-power mode may have an audio/video (AV) off state. The second low-power mode 730 may refer to a mode where the audio/video function is disabled and communication using the plurality of channels in the data channel is maintained. The first low-power mode 750 may refer to a mode in which the audio/video function is disabled and communication is performed using the networking channel different from the plurality of channels. Thus, the first low-power mode 750 consumes significantly less power than the second low-power mode 730. FIG. 7 further illustrates a switching operation among the normal mode, a second low-power mode and a first low-power mode according to an exemplary embodiment. Accordingly, the cable modem apparatus or the set-top box may enter one of the first low-power mode 750 and the second low-power mode 730, or stepwise enter the first low-power mode 750 after entering the second low-power mode 730, thereby reducing power consumption.

According to an aspect of an exemplary embodiment shown in FIG. 7, from a normal mode 710, it is possible to enter one of the second low-power mode 730 having an audio/video (AV)-off state, and the first low-power mode 750, in response to a received input. The input may be received through the input device, which may be a button of a remote controller, or the like.

According to another aspect of an exemplary embodiment, if no user input is received for a predetermined period of time in the normal mode 710, it is possible to automatically enter one of the second low-power mode 730 and the first low-power mode 750.

According to still another aspect of an exemplary embodiment, it is possible to enter the first low-power mode 750 from the second low-power mode 730, in response to receiving a predetermined input. Alternatively, it is possible to automatically enter the first low-power mode 750 if no user input is received for a predetermined period of time. For example, if a user selects the second low-power mode 730 through the remote controller to disable an audio/video function, the second low-power mode 730 may be automatically entered. After a predetermined amount of time elapses without additional input, the first low-power mode 750 may be automatically entered. According to an aspect of an exemplary embodiment, the predetermined amount of time may be thirty minutes. In the first low-power mode 750, the networking channel may be used for communication to reduce power consumption.

Alternatively, it is possible to enter the normal mode 710 from one of the first low-power mode 750 and the second low-power mode 730 in response to a user input. Furthermore, it is possible to automatically enter the normal mode 710 if there is no input for a more than a predetermined period of time.

Figure 2:
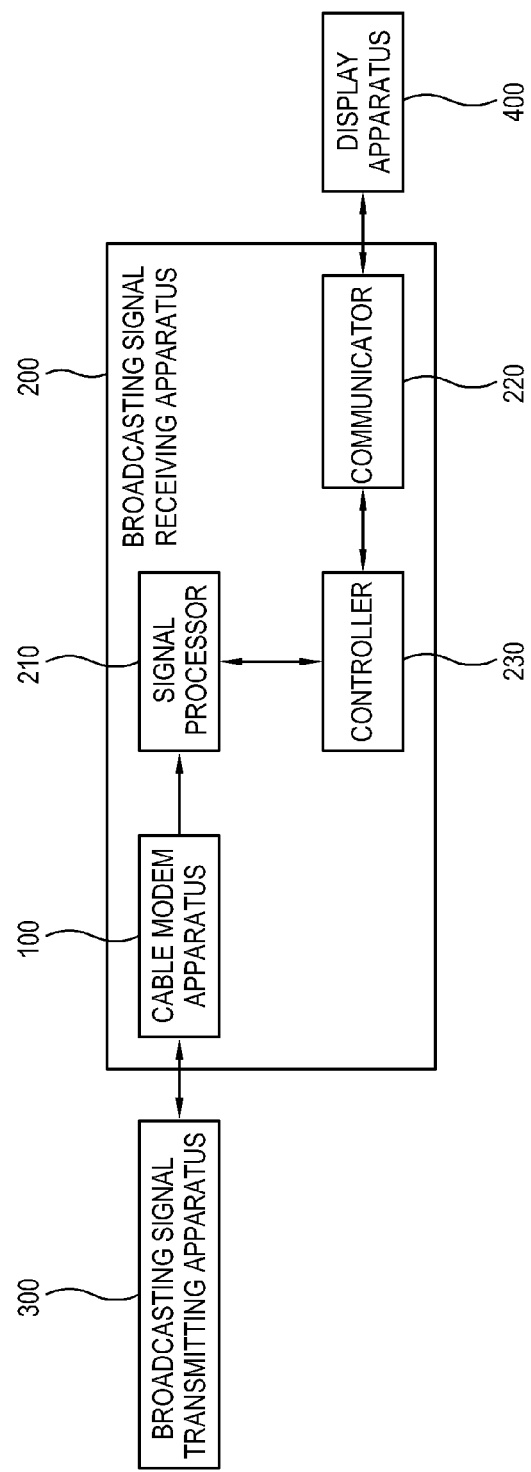
FIG. 2 is a block diagram of a broadcasting signal receiving apparatus with the cable modem apparatus according to an exemplary embodiment.

FIG. 2 is a block diagram illustrating an exemplary embodiment. As shown in FIG. 2, the broadcasting signal receiving apparatus 200 may include a cable modem apparatus 100, a signal processor 210, a communicator 220, and a controller 230. The broadcasting signal receiving apparatus 200 may communicate with the broadcasting signal transmitting apparatus 300 through the cable modem apparatus 100, and with the display apparatus 400 through the communicator 220. The broadcasting signal receiving apparatus 200 may, for example, be a set-top box including a cable modem. The display apparatus 400 may be, for example, a TV. The cable modem apparatus 100 included in the broadcasting signal receiving apparatus 200 comprises the same elements as those discussed above with reference to FIG. 1, and thus repetitive descriptions will be avoided.

The cable modem apparatus 100 included in the broadcasting signal receiving apparatus 200 may receive a broadcasting signal of a predetermined channel.

The signal processor 210 may process a broadcasting signal received in the cable modem apparatus 100 in accordance with a preset signal processing to display an image. Exemplary signal processing may include one or more of decoding, de-interlacing, scaling, noise reduction, detail enhancement, etc. Those of ordinary skill in the art would find it apparent that processing is not limited thereto. The signal processor 210 may be achieved by a system-on-chip (SOC) in which such various functions are integrated, or by an image processing board on which individual elements for independently performing each process are mounted.

The communicator 220 may communicate with the display apparatus 400, and the controller 230 may control the broadcasting signal processed in the signal processor 210 to be output to the display apparatus 400.

According to an aspect of an exemplary embodiment, the broadcasting signal receiving apparatus 200 may communicate with the broadcasting signal transmitting apparatus 300 by entering one of the normal mode and the first low-power mode in a manner similar to the cable modem apparatus 100 of FIG. 1. Communication may be switched between one of the data channel and the networking channel.

Figure 3:
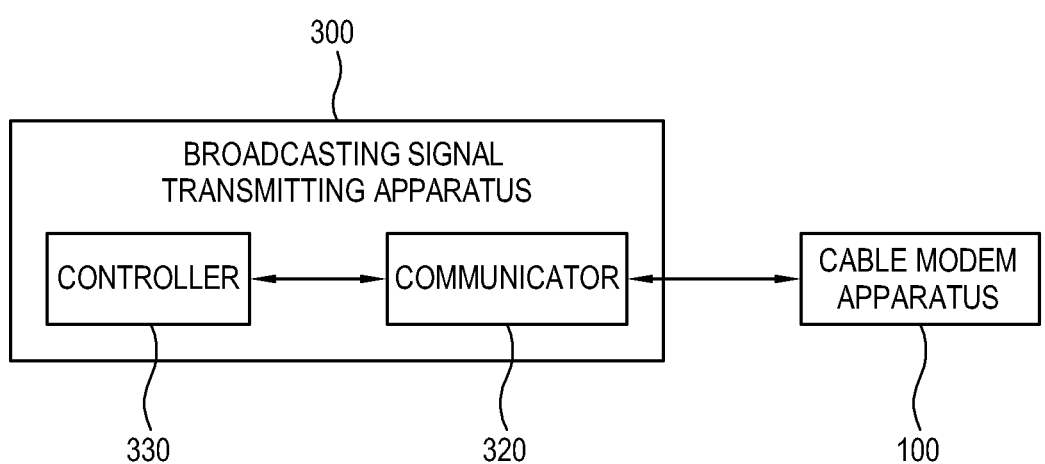
FIG. 3 is a block diagram of a broadcasting signal transmitting apparatus according to an exemplary embodiment.

FIG. 3 is a block diagram of a broadcasting signal transmitting apparatus according to an aspect of an exemplary embodiment. As shown in FIG. 3, the broadcasting signal transmitting apparatus 300 may include a communicator 320 and a controller 330. The broadcasting signal transmitting apparatus 300 may communicate with the cable modem apparatus 100. The broadcasting signal transmitting apparatus 300 may be, for example, a headend including the CMTS. The broadcasting signal transmitting apparatus 300 may communicate with the cable modem apparatus to transmit a broadcasting signal of a predetermined channel. The broadcasting signal transmitting apparatus 300 may continue to communicate with the cable modem apparatus in a first low-power mode entered while communicating with the cable modem apparatus in a normal mode through the data channel including a plurality of channels. The communication is continued by switching communication from the data channel, including the plurality of channels, to the networking channel different from the plurality of channels. The broadcasting signal transmitting apparatus 300 may transmit broadcasting signal data to the cable modem apparatus 100 by switching communication from the networking channel to the data channel having the plurality of channels in response to switching from the first low-power mode to the normal mode. Thus, according to an exemplary embodiment, the broadcasting signal transmitting apparatus 300 may switch the mode to consume only the minimum power for maintaining the communication if requested by the cable modem apparatus 100 to switch into the first low-power mode. The request may be made in accordance with a user input or expiration of a predetermined period of time without input, thereby reducing standby power.

The communicator 320 may communicate with the cable modem apparatus 100 to transmit a broadcasting signal of a predetermined channel. For example, the communicator 320 may use a hybrid fiber-coax (HFC) network for communication.

The controller 330 may control the communicator to continue to communicate with the cable modem apparatus 100 if a first low-power mode is entered while communicating with the cable modem apparatus 100 through the data channel, including a plurality of channels, in a normal mode. The controller 330 may control the communicator to communicate with the cable modem apparatus 100 by switching communication from the data channel including the plurality of channels to the networking channel different from the plurality of channels. When the broadcasting signal transmitting apparatus 300 transitions from communicating over the networking channel in the first low-power mode to the normal mode, the controller 330 may control the communicator to continue to transmit the data of the broadcasting signal to the cable modem apparatus 100. While operating in the first low-power mode, there may be fewer networking channels than the plurality of channels of the data channel. Also, the networking channel may be assigned to a frequency band different from the frequency of the data channel. According to an aspect of an exemplary embodiment, at least one of the plurality of channels of the data channel may be adjacent to the frequency band of the networking channel, and the plurality of channels for the data channel may be divisionally arranged with respect to the frequency band of the networking channel.

FIG. 6 shows frequencies of channels used in the normal mode and the first low-power mode according to an exemplary embodiment. For example, as shown in FIG. 6, the number of data channels 610 may be eight in the normal mode (a), and the number of networking channels 650 may be one smaller than the number of data channels 610 in the first low-power mode (b).

As shown in FIG. 6, the networking channel 620, 650 may be assigned to a frequency band different from those of the data channels 610, 640. In the normal mode illustrated in FIG. 6 (*a*), only the data channel 610 can be used to receive data of the broadcasting signal, and in the first low-power mode illustrated in FIG. 6 (*b*), only the networking channel 650 can be used to perform communication.

As shown in FIG. 6, the frequencies of data channels 610 and 640 may be adjacent to the frequency band of the networking channel 620, 650. For example, eight channels of the data channels 610 and 640 may be divided into four left channels and four right channels with respect to the frequency band of the networking channel 620, 650.

FIG. 11 shows an example of configuring a channel in the normal mode and the first low-power mode according to an exemplary embodiment. As shown in FIG. 11, in the normal mode (a), the data of the broadcasting signal is received through four channels 1130 each having a frequency band of 6 MHz, and in the first low-power mode (b) the communication is performed through one channel 1150 having a frequency band of 6 MHz. Thus, it is possible to reduce power consumption as there are fewer channels in the networking channel than there are in the data channels.

The controller 330 may switch from communicating over the data channel to communicating over the networking channel in response to a request from the cable modem apparatus, and send the cable modem apparatus 100 a command to switch into the networking channel. Also, the controller 330 may switch from communicating over the networking channel to communicating over the data channel in response to a request from the cable modem apparatus, and send the cable modem apparatus a command to switch into the data channel.

FIG. 5 shows an exemplary switching operation between a normal mode and a first low-power mode. As shown in FIG. 5, if the cable modem apparatus 550 makes a request for switching into the first low-power mode to the CMTS 500 of the broadcasting signal transmitting apparatus, the CMTS 500 switches the mode from communicating over the data channel to communicating over the networking channel (520), and sends the cable modem apparatus 550 a command of switching to the networking channel. The cable modem apparatus 550 may operate in the first low-power mode by switching communication from the data channel to the networking channel in accordance with the command.

If the cable modem apparatus 550 requests the CMTS 500 of the broadcasting signal transmitting apparatus to switch into the normal mode, the CMTS 500 switches the mode to change from communicating over the networking channel to communicating over the data channel (510), and transmits a command of switching to the data channel to the cable modem apparatus 550. The cable modem apparatus 550 can operate in the normal mode by switching from communicating over the networking channel to communicating over the data channel in accordance with the command.

Figure 4:
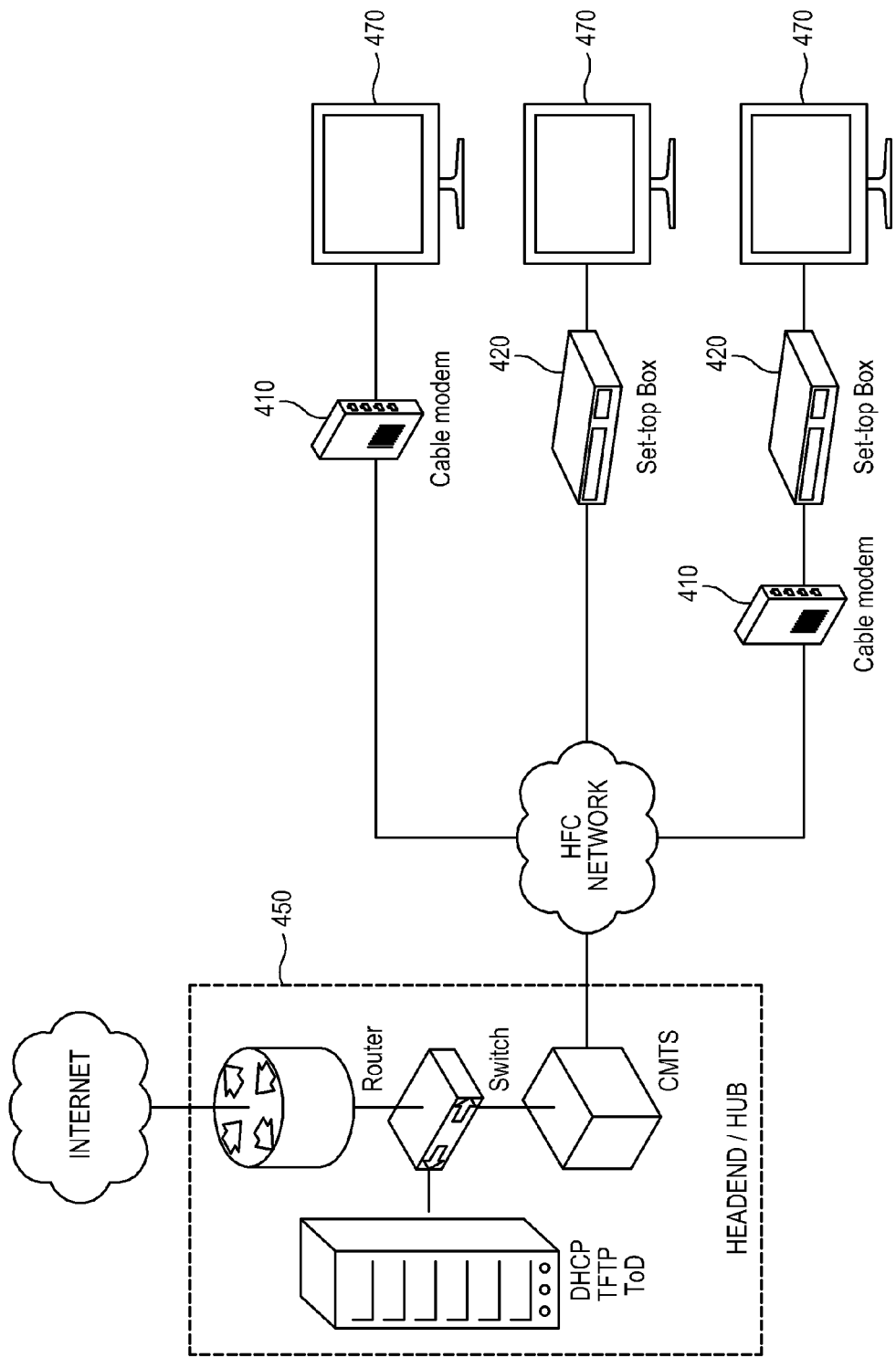
FIG. 4 illustrates a system with a headend and a cable modem according to an exemplary embodiment.

FIG. 4 shows a system with a headend and a cable modem according to an exemplary embodiment. As shown in FIG. 4, the broadcasting signal transmitting apparatus 300 may be a headend 450, and the cable modem apparatus 100 connected to the headend 450 through the HFC network may be a cable modem 410. Alternatively, the cable modem apparatus 100 connected to the headend 450 may be the set-top box 420, or the cable modem 410 and the set-top box 420. The cable modem 410 or the set-top box 420 may be connected to the display apparatus 470 and output an image of the broadcasting signal. According to an exemplary embodiment, the system including the headend 450 and the cable modem 410 has an advantage of continuous communication while switching between the normal mode and the first low-power mode.

Figure 8:
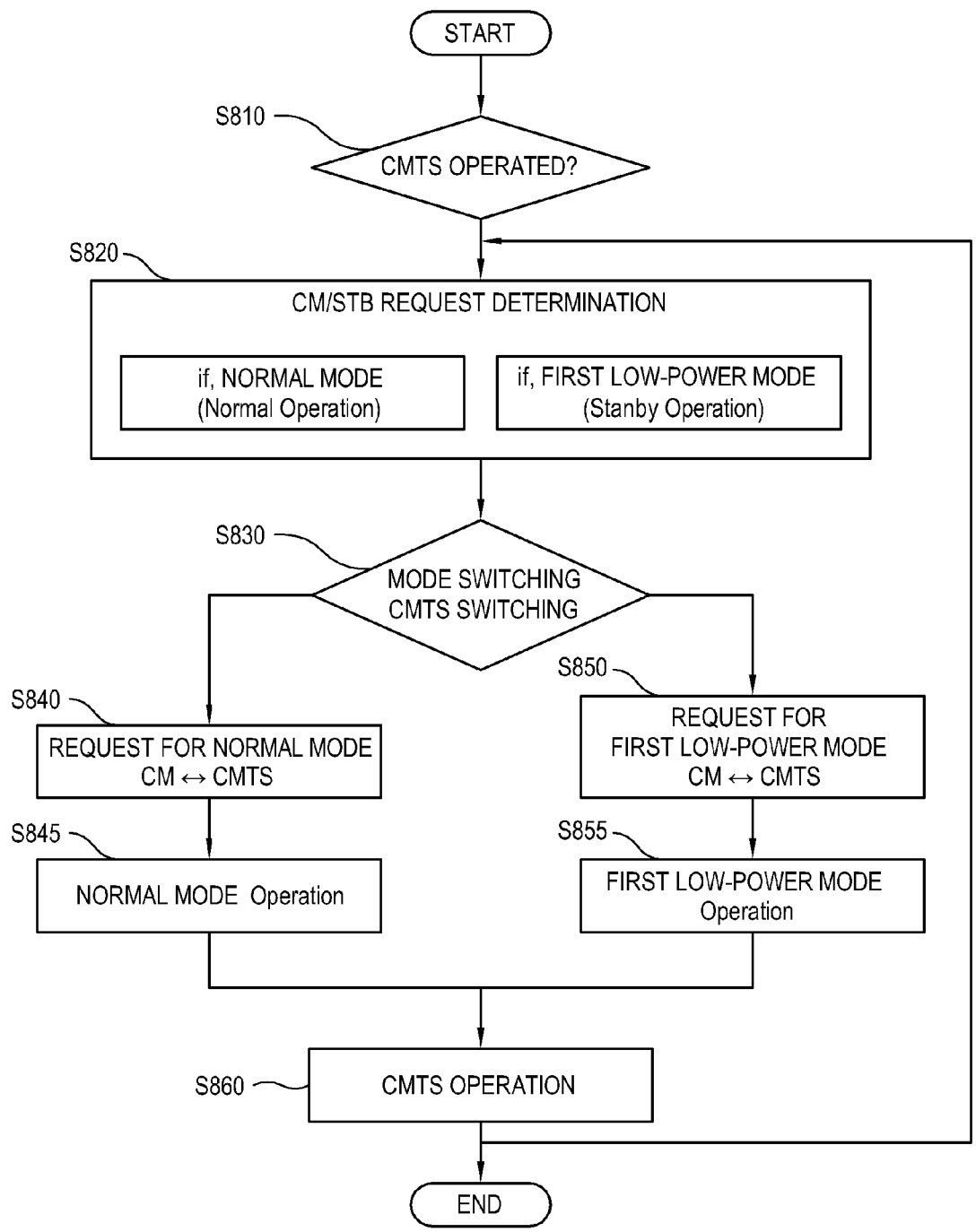
FIG. 8 is a flowchart illustrating an exemplary mode switching method of the cable modem and a cable modem termination system (CMTS) according to an exemplary embodiment.

FIG. 8 is a flowchart showing a mode switching method of the cable modem and a cable modem termination system (CMTS) according to an exemplary embodiment. As shown in FIG. 8, at operation S810, the cable modem termination system (CMTS) must be operating in order to control the cable modem. At operation S820, one of the cable modem (CM) and the set-top box (STB) determines whether to operate in one of the normal mode and the first low-power mode, and requests the CMTS to switch into the determined mode. At operation S830, the CMTS switches the mode into a mode requested by one of the CM and the STB. In the case of switching into the normal mode, at operation S840 the CMTS requests the CM to switch into the normal mode, and at operation S845 the CM operates in the normal mode in response to the request. In the case of switching into the first low-power mode, at operation S850 the CMTS requests the CM to switch into the first low-power mode, and at operation S855 the CM operates in the first low-power mode in response to the request. Lastly, at operation S860 the CMTS performs its original operation again.

Figure 9:
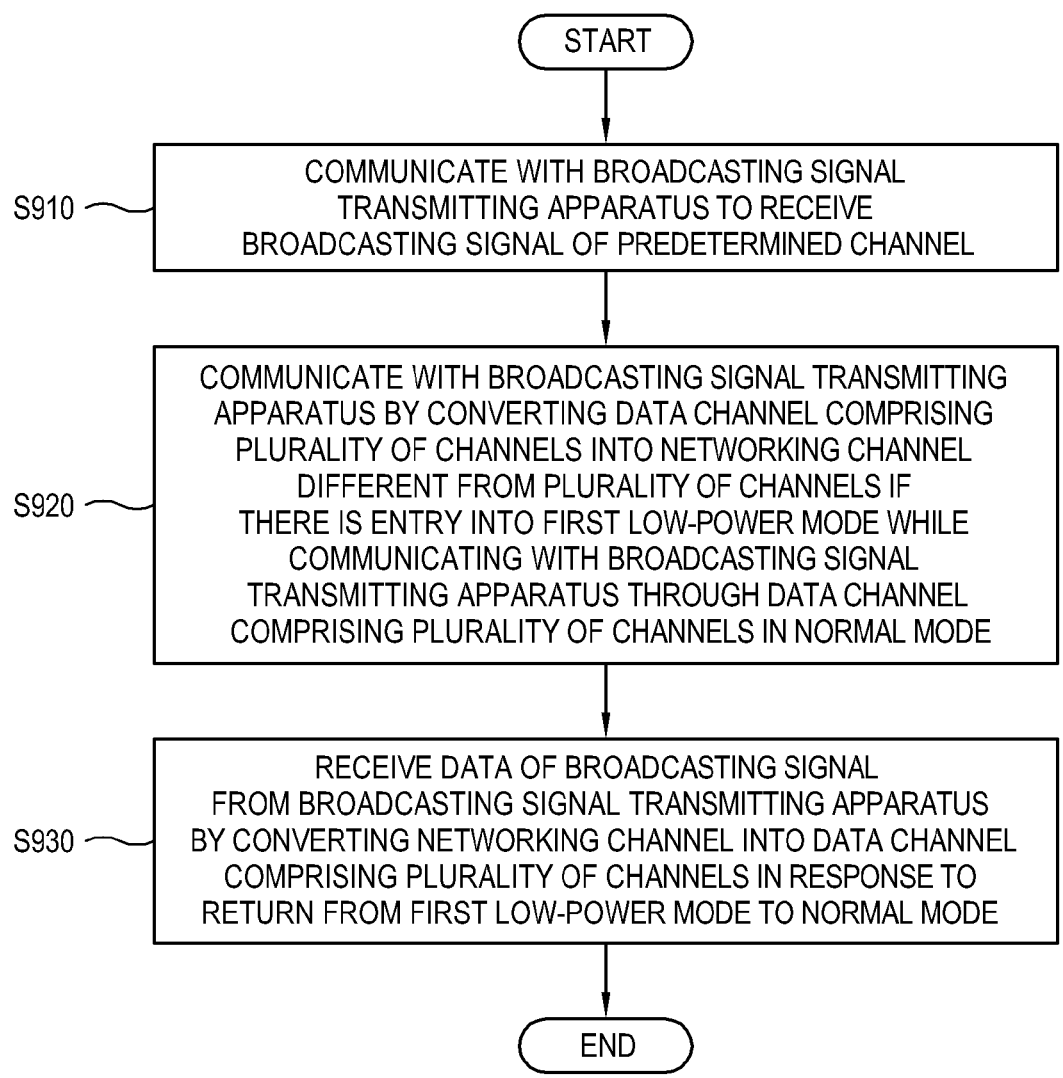
FIG. 9 is a flowchart illustrating an exemplary control method of a cable modem apparatus according to an exemplary embodiment.

FIG. 9 is a flowchart showing a control method of a cable modem apparatus according to an exemplary embodiment. As shown in FIG. 9, at operation S910, the cable modem apparatus communicates with the broadcasting signal transmitting apparatus to receive a broadcasting signal of a predetermined channel. Next, at operation S920, the cable modem apparatus communicates with the broadcasting signal transmitting apparatus 300 by switching communication from the data channel including the plurality of channels to the networking channel different from the plurality of channels if there is entry into the first low-power mode while communicating with the broadcasting signal transmitting apparatus 300 through the data channel including the plurality of channels in the normal mode. Lastly, at operation S930, the cable modem apparatus receives the data of the broadcasting signal from the broadcasting signal transmitting apparatus by switching communication from the networking channel to the data channel including the plurality of channels in response to returning from the first low-power mode to the normal mode.

According to an exemplary embodiment, the networking channel may include fewer channels than the number of the plurality of channels comprising the data channel. As shown in FIG. 6, the number of data channels 610 may be, for example, eight in the normal mode (a), and the number of networking channels 650 may be, for example, smaller than the number of data channels 610 in the first low-power mode (b).

Also, the networking channel may be assigned to frequency bands different than those of the data channel. As shown in FIG. 6, the networking channels 620, 650 may be assigned to frequency bands different than those of the data channels 610, 640. In the normal mode illustrated in FIG. 6 (a), only the plurality of channels comprising the data channel 610 can be used to receive data of the broadcasting signal. In the first low-power mode illustrated in FIG. 6 (b), only the networking channel 650 can be used to perform communication.

At least one channel among the plurality of channels of the data channel may be adjacent to the frequency band of the networking channel, and the plurality of channels for the data channel may be divisionally arranged with respect to the frequency band of the networking channel. As shown in FIG. 6, the data channels 610 and 640 are adjacent to the frequency band of the networking channels 620, 650. For example, eight channels of the data channels 610 and 640 are divided into four left channels and four right channels with respect to the frequency band of the networking channel 620, 650.

According to another exemplary embodiment, there may be provided an operation of requesting the broadcasting signal transmitting apparatus to switch to use the networking channel when entering the first low-power mode, and an operation of changing from communicating over the data channel to communicating over the networking channel. Also, there may be provided an operation of requesting the broadcasting signal transmitting apparatus to be switched to use the data channel when returning to the normal mode, and an operation of changing from communicating over the networking channel to communicating over the data channel.

Specifically, as shown in FIG. 5, if the cable modem apparatus 550 enters the first low-power mode, the CMTS 500 of the broadcasting signal transmitting apparatus may be requested to switch into the first low-power mode, and then the CMTS 500 may then switch to the mode using the networking channel (520) and send the cable modem apparatus 550 a command of switching communication to the networking channel. Thus, the cable modem apparatus 550 may switch from communicating over the data channel to communicating over the networking channel. Also, if the cable modem apparatus 550 desires to enter the normal mode and requests the CMTS 500 to switch into the normal mode, the CMTS 500 switches the mode to communicate using the data channel (510) and sends the cable modem apparatus 550 a command of switching to the data channel. Thus, the cable modem apparatus 550 can be switched to using the data channel.

Alternatively, there may be further provided an operation of receiving a user input, and an operation of entering one of the normal mode and the first low-power mode in accordance with the user input. Also, if there is no user input for a predetermined period of time, there may be provided an operation of entering the first low-power mode. As shown in FIG. 7, it is possible to switch from the normal mode 710 to the second low-power mode 730 of the AV-off state or to the first low-power mode 750 in response to a user input through the button of the remote controller or the like. Alternatively, if there is no user input in the normal mode 710 for a predetermined period of time, it may be possible to automatically enter one of the second low-power mode 730 and the first low-power mode 750. Alternatively, it may be possible to switch from the second low-power mode 730 to the first low-power mode 750 in accordance with a user input, or automatically switch from the second low-power mode 730 to the first low-power mode 750 if there is no user input for a predetermined period of time.

Alternatively, it is possible to switch from one of the first low-power mode 750 and the second low-power mode 730 to the normal mode 710 in accordance with a user input, and automatically enter one of the first low-power mode 750 and the second low-power mode 730 from the normal mode if there is no user input for a predetermined period of time.

Figure 10:
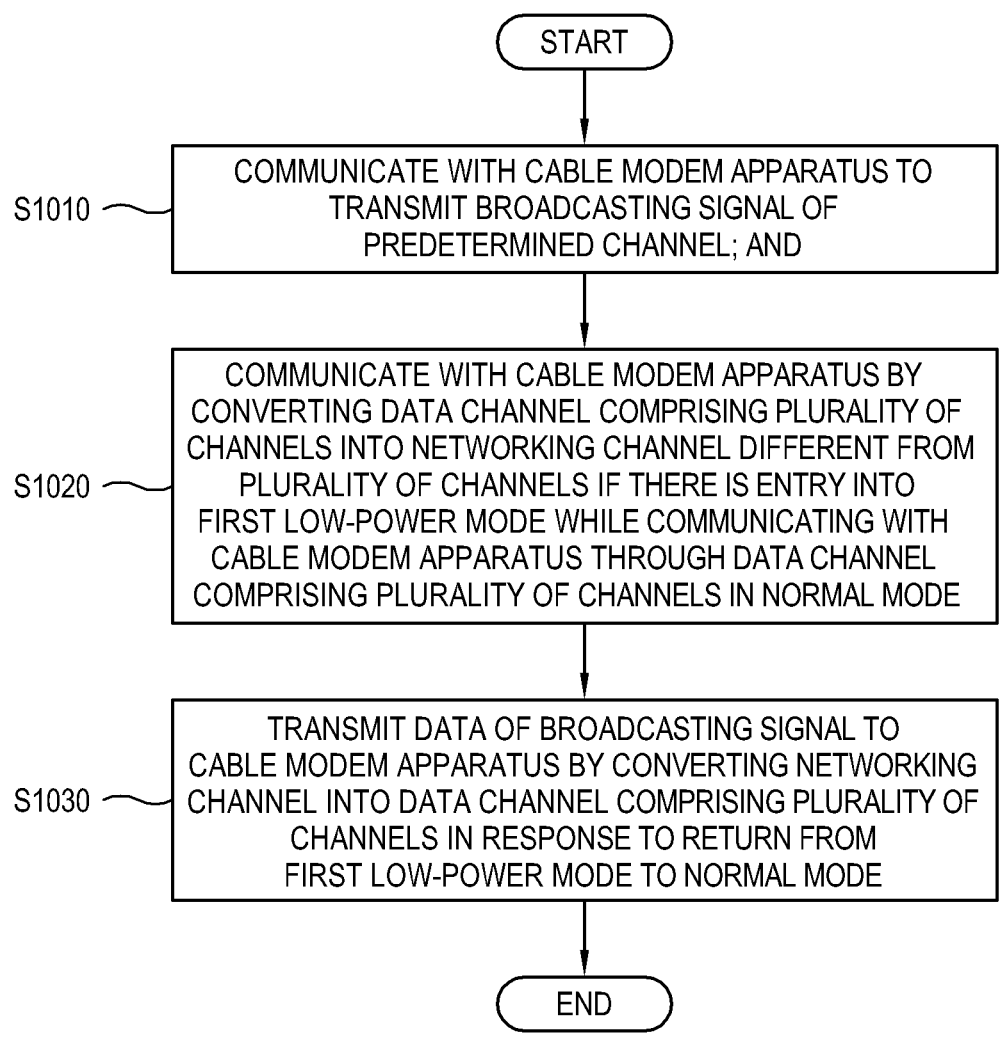
FIG. 10 is a flowchart illustrating an exemplary control method of a broadcasting signal transmitting apparatus according to an exemplary embodiment.

FIG. 10 is a flowchart showing a control method of a broadcasting signal transmitting apparatus according to an exemplary embodiment. As shown in FIG. 10, at operation S1010, the broadcasting signal transmitting apparatus communicates with the cable modem apparatus to transmit a broadcasting signal of a predetermined channel. Next, at operation S1020, the broadcasting signal transmitting apparatus communicates with the broadcasting signal transmitting apparatus 300 by switching from communicating over the data channel including the plurality of channels to communicating over the networking channel different from the plurality of channels if there is entry into the first low-power mode while communicating with the broadcasting signal transmitting apparatus 300 in the normal mode. Lastly, at operation S1030, the broadcasting signal transmitting apparatus transmits data of a broadcasting signal to the cable modem apparatus by switching from communicating over the networking channel to communicating over the data channel including the plurality of channels in response to returning to the normal mode from the first low-power mode.

According to an exemplary embodiment, the networking channel may be fewer channels than the plurality of channels for the data channel. Also, the networking channel may be assigned to a frequency band different from the frequencies of the data channel. Also, at least one among the plurality of channels for the data channel may be adjacent to the frequency band of the networking channel, and the plurality of channels for the data channel may be divisionally arranged with respect to the frequency band of the networking channel.

According to another exemplary embodiment, there may be an operation of switching from communicating over the data channel to communicating over the networking channel in response to the request of the cable modem apparatus, and an operation of sending the cable modem apparatus a command of changing into the networking channel. Also, there may be provided an operation of switching from communicating over the networking channel to communicating over the data channel in response to a request of the cable modem apparatus, and an operation of sending the cable modem apparatus a command of changing into the data channel.

As described above, according to an exemplary embodiment, a cable modem apparatus may receive a broadcasting signal of a predetermined channel, communicate by switching from a data channel including a plurality of channels to a networking channel different from the plurality of channels if there is entry into a first low-power mode while communicating through the data channel including the plurality of channels in a normal mode, thereby effectively reducing standby power.

Although a few exemplary embodiments have been shown and described, it will be appreciated by those skilled in the art that changes may be made in these exemplary embodiments without departing from the principles and spirit of the disclosure, the scope of which is defined in the appended claims and their equivalents.

What is claimed is:
1. A cable modem apparatus including:
a communicator that communicates with a broadcasting signal transmitting apparatus; and
a controller that controls the communicator:
to receive a broadcasting signal from the broadcasting signal transmitting apparatus through a data channel including a plurality of channels assigned to a first frequency band in a normal mode,
to transmit a request for changing into a first low-power mode to the broadcasting signal transmitting apparatus in response to an entry into the first low-power mode from the normal mode,
to receive a command for switching to a networking channel assigned to a second frequency band that does not overlap with the first frequency band, wherein the second frequency band is adjacent to the first frequency band, and the command is received from the broadcasting signal transmitting apparatus in response to the request received by the broadcasting signal transmitting apparatus,
to switch from the data channel to the networking channel based on the command received from the broadcasting signal transmitting apparatus, and
to communicate with the broadcasting signal transmitting apparatus through the networking channel in the first low-power mode,
wherein the controller controls the communicator to use the networking channel for communicating instead of the data channel for receiving the broadcasting signal in the first low-power mode.

2. The cable modem apparatus according to claim 1, wherein the networking channel comprises a first quantity of channels that is less than a second quantity of the plurality of channels for the data channel.

3. The cable modem apparatus according to claim 1, wherein one or more frequency bands of the first frequency band are divisionally arranged with respect to the second frequency band.

4. The cable modem apparatus according to claim 1, wherein the controller transmits a request to the broadcasting signal transmitting apparatus to switch communication to the data channel in response to entry into the normal mode, and switches communication from the networking channel to the data channel.

5. The cable modem apparatus according to claim 1, further comprising a user interface that receives a user input, wherein the controller enters one of the normal mode and the first low-power mode in response to the user interface receiving the user input.

6. The cable modem apparatus according to claim 5, wherein the controller determines expiration of a period of time since the user interface last received the user input and enters the first low-power mode in response to determining expiration of the period of time.

7. The cable modem apparatus according to claim 1, wherein the controller switches from the normal mode to a second low-power mode in which audio/video is disabled, and from the second low-power mode to the first low-power mode or the normal mode.

8. The cable modem apparatus according to claim 1, wherein the controller controls the communicator to transmit and receive data of the broadcasting signal over the data channel, and to transmit and receive information for entering from the normal mode to the first low-power mode over the networking channel.

9. A broadcasting signal receiving apparatus comprising:
a cable modem apparatus comprising:
a communicator that communicates with a broadcasting signal transmitting apparatus; and
a controller that controls the communicator:
to receive a broadcasting signal from the broadcasting signal transmitting apparatus through a data channel including a plurality of channels assigned to a first frequency band in a normal mode,
to transmit a request for changing into a first low-power mode to the broadcasting signal transmitting apparatus in response to an entry into the first low-power mode from the normal mode,
to receive a command for switching to a networking channel assigned to a second frequency band that does not overlap with the first frequency band, wherein the second frequency band is adjacent to the first frequency band, and the command is received from the broadcasting signal transmitting apparatus in response to the request received by the broadcasting signal transmitting apparatus,
to switch from the data channel to the networking channel based on the command received from the broadcasting signal transmitting apparatus, and
to communicate with the broadcasting signal transmitting apparatus through the networking channel in the first low-power mode;
a signal processor that processes the broadcasting signal received in the cable modem apparatus and to display an image corresponding to the broadcasting signal as processed,
wherein the communicator communicates with a display apparatus, and the controller outputs the broadcasting signal as processed to the display apparatus, and
wherein the controller controls the communicator to use the networking channel for communicating instead of the data channel for receiving the broadcasting signal in the first low-power mode.

10. A broadcasting signal transmitting apparatus comprising:
a communicator that communicates with a cable modem apparatus and to transmit a broadcasting signal of a predetermined channel to the cable modem apparatus; and
a controller that controls the communicator:
to transmit the broadcasting signal to the cable modem apparatus through a data channel including a plurality of channels assigned to a first frequency band in a normal mode,
to receive a request for changing into a first low-power mode from the cable modem apparatus in response to an entry into the first low-power mode from the normal mode,
to switch from the data channel to a networking channel assigned to a second frequency band that does not overlap with the first frequency band,
wherein the second frequency band adjacent to the first frequency band, based on the request received from the cable modem apparatus,
to transmit, to the cable modem apparatus, a command for switching to the networking channel, and
to communicate with the cable modem apparatus through the networking channel in the first low-power mode,
wherein the controller controls the communicator to use the networking channel for communicating with the cable modem apparatus instead of the data channel for transmitting the broadcasting signal in the first low-power mode.

11. The broadcasting signal transmitting apparatus according to claim 10, wherein the networking channel comprises a first quantity of channels that is less than a second quantity of the plurality of channels for the data channel.

12. The broadcasting signal transmitting apparatus according to claim 10, wherein one or more frequency bands of the first frequency band are divisionally arranged with respect to the second frequency band.

13. The broadcasting signal transmitting apparatus according to claim 10, wherein the controller switches communication from the networking channel to the data channel in response to a request from the cable modem apparatus, and sends the cable modem apparatus a command to switch communication to the data channel.

14. A broadcasting signal transmitting apparatus according to claim 10, wherein the controller controls the communicator to transmit and receive data of the broadcasting signal over the data channel, and to transmit and receive information for entering from the normal mode to the first low-power mode over the networking channel.

15. A method of controlling a cable modem apparatus, the method comprising:
receiving, by a communicator of the cable modem apparatus, a broadcasting signal from a broadcasting signal transmitting apparatus through a data channel that is assigned to a first frequency band in a normal mode;
transmitting, by the communicator, a request for changing into a first low-power mode to the broadcasting signal transmitting apparatus in response to entry into the first low-power mode from the normal mode;
receiving, by the communicator, a command for switching to a networking channel assigned to a second frequency band that does not overlap with the first frequency band, wherein the second frequency band is adjacent to the first frequency band, and the command is received from the broadcasting signal transmitting apparatus in response to the request received by the broadcasting signal transmitting apparatus;
switching, by the communicator, from the data channel to the networking channel based on the command received from the broadcasting signal transmitting apparatus; and communicating with the broadcasting signal transmitting apparatus through the networking channel in the first low-power mode,
wherein the switching comprises using the networking channel for communicating instead of the data channel for receiving the broadcasting signal in the first low-power mode.

16. The method according to claim 15, further comprising:
transmitting a request to the broadcasting signal transmitting apparatus to switch communication to the data channel in response to entry into the normal mode, and switching communication from the networking channel to the data channel.

17. The method according to claim 15, further comprising:
switching from the normal mode to a second low-power mode of an audio/video-off state, or switching from the second low-power mode to the first low-power mode.

18. A method of controlling a broadcasting signal transmitting apparatus, the method comprising:
transmitting, by a communicator of the broadcasting signal transmitting apparatus, a broadcasting signal to a cable modem apparatus through a data channel that is assigned to a first frequency band in a normal mode;
receiving, by the communicator, a request for changing into a first low-power mode from the cable modem apparatus in response to an entry into the first low-power mode from the normal mode;
switching, by the communicator, from the data channel to a networking channel assigned to a second frequency band that does not overlap with the first frequency band, wherein the second frequency band is adjacent to the first frequency band based on the request received from the cable modem apparatus;
transmitting, to the cable modem apparatus, by the communicator, a command for switching to the networking channel; and
communicating with the cable modem apparatus through the networking channel in the first low-power mode,
wherein the switching comprises using the networking channel for communicating with the cable modem apparatus instead of the data channel for transmitting the broadcasting signal in the first low-power mode.

19. The method according to claim 18, further comprising:
switching communication from the networking channel to the data channel in response to receiving a request from the cable modem apparatus; and
transmitting the cable modem apparatus a command of switching communication to the data channel.

* * * * *